US00RE35759E

United States Patent [19]

DeGraaf et al.

[11] E Patent Number: Re. 35,759

[45] Reissued Date of Patent: Mar. 31, 1998

[54] POLYESTER-ACRYLIC GRAFT POLYMERS FOR USE IN POWDER COATINGS

[75] Inventors: Henry J. DeGraaf, Stow; Susan M. Sobek, Brunswick, both of Ohio

[73] Assignee: Ferro Corporation, Cleveland, Ohio

[21] Appl. No.: 721,296

[22] Filed: Sep. 26, 1996

Related U.S. Patent Documents

Reissue of:

[64] Patent No.: 5,350,810
Issued: Sep. 27, 1994
Appl. No.: 152,341
Filed: Nov. 12, 1993

U.S. Applications:

[62] Division of Ser. No. 829,510, Feb. 3, 1992, Pat. No. 5,280, 089.

[51] Int. Cl.[6] ..... C08L 67/02; C08F 20/62

[52] U.S. Cl. ..... 525/445; 525/444; 525/424; 525/425; 525/410

[58] Field of Search ..... 525/425, 424, 525/444, 10, 445

[56] References Cited

U.S. PATENT DOCUMENTS

| | | | |
|---|---|---|---|
| 4,131,714 | 12/1978 | Karkoski | 428/379 |
| 4,143,093 | 3/1979 | Rutter | 525/444 |
| 4,576,997 | 3/1986 | Trotter | 525/444 |
| 5,057,561 | 10/1991 | Manica | 524/68 |

FOREIGN PATENT DOCUMENTS

| | | |
|---|---|---|
| 4139664 | 10/1979 | Japan . |
| 1098771 | 5/1986 | Japan . |
| 2043451 | 2/1987 | Japan . |
| 3245479 | 10/1988 | Japan . |
| 068939 | 4/1976 | U.S.S.R. . |

OTHER PUBLICATIONS

CA 94(18) 141346v.

CA 83(10) 81498g.

*Primary Examiner*—Irina S. Zemel
*Attorney, Agent, or Firm*—Rankin, Hill, Porter & Clark

[57] ABSTRACT

A thermosetting powder paint coating containing a polymeric binder comprising a polyester graft acrylic copolymer and a low molecular weight crystalline polyester. The coatings can be pigmented or non-pigmented. The polyester-graft-acrylic copolymer can be self-crosslinking by the inclusion of beta-hydroxy ester groups or crosslinked by an external crosslinker.

7 Claims, No Drawings

POLYESTER-ACRYLIC GRAFT POLYMERS FOR USE IN POWDER COATINGS

Matter enclosed in heavy brackets [ ] appears in the original patent but forms no part of this reissue specification; matter printed in italics indicates the additions made by reissue.

This is a divisional of application(s) U.S. patent application Ser. No. 07/829,510 filed on Feb. 3, 1992, now U.S. Pat. No. 5,280,089.

This invention pertains to protective surface coating compositions and more particularly to powder coatings based on polyester-graft-acrylic polymers in combination with a low melting point crystalline polyester polymer. The coating composition is thermosetting by said polymers being coreactive or coreacted with a crosslinker upon heat curing the coating applied to a substrate.

BACKGROUND OF THE INVENTION

Paint coatings are used as surface protective coatings applied to substrates as a continuous film for the purpose of decorative appearance as well as protection of the substrate. Thermosetting paint coatings can be fluid liquid coatings or fusible solid compositions adapted to flow out and form a continuous paint film when heat cured. A paint coating ordinarily comprises an organic binder, pigments, and various additives. The polymeric binder acts as a vehicle for uniformly mixing the pigments and other components and functioning as a binder for the pigments in the cured or hardened paint film. The binder imparts rheological properties to the paint coating and provides adhesion of the paint film to the substrate.

Powder paints can be thermosetting or thermoplastic clear or pigmented paint coatings and ordinarily are factory applied coatings and cured under heat. Powder paint comprises dry particles and typically are compounded by dry blending of components followed by melt expansion grinding, and screening, to form a dry free-flowing powder. Powder paints are applied to a substrate as a powder but adapted to flow out on the substrate upon heat curing of the powder. The pigments may be organic or inorganic and functionally contribute to opacity and color in addition to durability and hardness, although some powder paint coatings contain little or no opacifying pigments and are described as clear coatings. Polymers for powder coatings ordinarily are solvent-free and non-sintering solids at room temperature which must resist fusing in the container and are considered stable if sintering does not occur at 40° C. for an extended length of time. Impact fusion of a powder coating formula in automated application systems is a further problem to avoid. Problems with stability and impact fusion can be avoided by the tack temperature of a polymer being at least 150° F. Tack temperature (Tt) is a measure of the sinter point of a powdered polymer in one minute of time. A useful tack temperature range of 175° F. to 190° F. is preferred for polymers used in most powder formulations.

In liquid paint formulations, soft (low Tg) polymeric components are often included in polymer synthesis to impart desirable properties such as flexibility, impact, and flow to the coating. However, soft low Tg components are either avoided or kept to a minimum in powder coating polymers, due to stability and impact fusion problems. For a coating technology to be feasible for powder coatings, the resin system must be a solid at room temperature and must soften at the extrusion temperature. The resin viscosity must also allow for adequate mixing and dispersion of pigments and additives during the residence time in the extruder, which enables a homogeneous melt-mixed product to be produced. The extrudate must be friable to enable grinding of the extrudate and flake to normal mean particle size distributions of about 25–40μ. Powder paint must apply well by a corona discharge gun and must electrostatically adhere to a metal part. At the bake temperature, the powder must melt and flow to produce a smooth, glossy finish and needs to cure at temperatures of about 300° F. to 400° F. Physical and mechanical properties such as gloss, hardness, flexibility, solvent resistance and corrosion resistance are highly desirable.

Polyester and acrylic polymers are polymers commonly used in powder coatings formulations. Polyesters usually are terephthalic acid based, high molecular weight, highly linear, amorphous, high melting polymers. Useful acrylics are high Tg and high melting polymers with hydroxyl or glycidyl functionality for crosslinking (curing) of the polymer. Acrylic/polyester blends are desirable for powder paints because straight acrylic systems tend to produce weatherable hard coatings, but unfortunately, lack the flexibility required for many end-uses. Polyester coatings are flexible and tough but, in general, provide inferior weatherability. In liquid coating technologies, the two polymer types mixed with organic solvent can be mixed to form a blend of acrylic polymer with a polyester polymer in the coating formulation to obtain both weatherability and flexibility. However, blending of acrylic and polyester polymers is not easy achieved in powder coatings inasmuch as the lack of solvent raises the free energy of mixing to such an extent that polymer incompatibility becomes a major obstacle and mixing of an acrylic polymer with a polyester polymer is not easily attained.

It now has been found that a thermosetting powder coating composition exhibiting excellent blend of physical properties such as appearance, flexibility/hardness, solvent resistance, corrosion resistance and exterior durability based on polyester-graft-acrylic copolymer can be produced. The polyester-graft-acrylic produces compatibility with low melting crystalline polyesters to provide a coating which can be heat cured and crosslinked. The present invention utilizes a grafting technique to compatibilize acrylic polymer chains with polyester polymer chains. The cure mechanism can include a latent catalyst which gives the coating time to flow, wherein the catalyst activates the crosslinking cures with the polyester-graft-acrylic resin producing a smooth, flexible film. The present invention utilizes the uniqueness of polyester-graft-acrylic copolymers in combination with low molecular weight crystalline polyester compounds in powder coatings, which promotes sufficient compatibility between the polyester polymer chains and the acrylic polymer chains in a blend of otherwise incompatible polymers. In addition, the physical integrity properties of powder coatings are considerably enhanced. For instance, the powder paints of this invention exhibit improved physical properties, excellent melt-flow rheology/smoother appearance, higher flexibility and impact resistance, as well as good overall coating performance, i.e., gloss, color, hardness. The process of the invention provides improved compatible polymeric blends with useful tack temperatures in the range of 160°–190° F. along with desirable storage stability. Early attempts at blending the polyester polymers with acrylic polymers were unsuccessful due to either incompatibility or processing difficulties associated with widely varied viscosities, but these problems are overcome by this invention. Compatibility and eutectic melt problems have been eliminated or minimized to commercially acceptable levels for both powder processing (extruding/flaking/grinding) and commercial storage of the finished powder. These and other advantages of this invention will become more apparent from the detailed description of the invention.

SUMMARY OF THE INVENTION

Briefly, the composition of this invention pertains to powder paint containing a compatible polymeric blend comprising on a weight basis between 60% and 98% of polyester-graft-acrylic copolymer and between 2% and 40% low melting crystalline polyester polymer. The process for producing the polyester-graft-acrylic copolymer include the steps of preparing a carboxyl functional linear polyester prepolymer comprising ethylene glycol esterified with dodecanedioic acid, reacting the polyester prepolymer with oxirane functional ethylenic monomer to produce a polyester pre-polymer intermediate containing pendant double bond unsaturation, followed by in-situ copolymerization with ethylenically unsaturated monomers, including vinyl acrylic or acrylic monomers, to coreact by addition polymerization with the pendant double bond unsaturation. The crystalline polyester can be hydroxyl functional or carboxyl functional, where preferred compositions contain between 10 and 30 weight parts hydroxyl functional crystalline polyester or between 25 and 50 weight parts carboxyl functional crystalline polyester per 100 weight parts of polyester-graft-acrylic copolymer. The polyester-graft-acrylic copolymer can be blended with the low melt crystalline polyester and suitable crosslinkers if desired to provide a thermosetting polymeric binder system for powder paint.

DETAILED DESCRIPTION OF THE INVENTION

The powder paint of this invention is based on a polymeric binder comprising a compatible polymeric blend of a polyester-graft-acrylic copolymer and a low-melt crystalline polyester.

Referring first to the polyester-graft-acrylic copolymer matrix polymer, the graft copolymer is produced by first producing a low molecular weight linear polyester prepolymer containing carboxyl functionality, then reacting the prepolymer with glycidyl acrylate to produce pendant double bond groups, followed by in-situ copolymerization of ethylenic monomers to coreact with the pendant double bonds.

The polyester prepolymer primarily comprises the reaction product of ethylene glycol with dodecanedioic dicarboxylic acid to produce a linear, low molecular weight carboxyl functional prepolymer. On an equivalent basis, the preferred polyester prepolymer comprises between about 0.6 and 2 equivalents of dodecanedioic dicarboxylic acid esterified with one equivalent of ethylene glycol. Useful polyester prepolymers can comprise 90% to 100% of these reactants. Although not preferred, minor amounts of less than 10% of the equivalents of dicarboxylic acid can include similar linear aliphatic dicarboxylic acids such as adipic acid, azelaic acid, sebacic acid, succinic acid or similar linear dicarboxylic acids. Preferred composition contain only dodecanedioic acid. Up to 50% of the equivalents of glycol can include similar linear glycols such as 1,4-butylene glycol, 1,6-hexene diol, although 100% ethylene glycol is preferred. The polyester prepolymer should contain at least 0.1 millequivalents of carboxylic acid per gram prepolymer and should have an Acid No. above 5 and preferably between 7 and 125. The number average molecular weight of the polyester prepolymer should be less than 3,000. For a hydroxyl functional pre-polymer, the equivalents of unreacted carboxyl groups on the polyester prepolymer comprise at least 0.1 millequivalents, preferably between 0.12 and 0.45 meqv., per gram of polyester prepolymer and are reacted with an equivalent amount of oxirane monomer to produce an unsaturated polyester intermediate polymer containing pendant double bond unsaturation. For carboxyl functional prepolymers, the equivalents of unreacted carboxyl groups comprise at least 0.7 millequivalents, preferably between 0.8 meqv. to about 2.25 meqv., per gram of polyester prepolymer. A lessor equivalency of GMA is reacted with the unreacted carboxyl equivalents and preferably between about 7% and 25% of unreacted carboxyl equivalents. In any event, the reaction favors the reaction of carboxyls on the polyester with oxirane on the GMA prior to addition polymerization of the ethylenic monomers.

In accordance with preferred aspects of this invention, the low molecular weight polyester prepolymer is then reacted with oxirane ethylenic monomers containing oxirane functionality which esterifies with the carboxyl functionality on the polyester prepolymer to produce an intermediate polymer containing a pendant double bond. Oxirane functional ethylenic monomers include, for example, acrylic, methacrylic, or vinyl ester derivatives of glycidol. Preferred oxirane monomers contain pendant oxirane and include glycidyl acrylate, glycidyl methacrylate, and allyl glycidyl ether where acrylates are preferred. On a weight basis, the intermediate polymer comprising oxirane monomer extended polyester prepolymer contains between about 0.5% to 5%, preferably between 0.7% to 2.5% by weight esterified oxirane ethylenic monomer to produce pendant double bonds on the polyester intermediate. The polyester double bonds are copolymerized with other ethylenically unsaturated monomers, including functional hydroxyl or carboxyl monomers by in-situ addition copolymerization. Addition copolymerization is effected by copolymerization of the ethylenic monomers in the presence of typically about 0.5 to 4% by weight peroxide or azo initiators for activating addition copolymerization based on the weight of the ethylenic monomers copolymerized. Polymerizable ethylenically unsaturated monomers contain carbon-to-carbon unsaturation and include vinyl monomers, acrylic monomers, allylic monomers and acrylamide monomers. Vinyl esters include vinyl acetate, vinyl propionate, vinyl butyrates, vinyl benzoates, vinyl isopropyl acetates , and similar vinyl esters. Vinyl halides include vinyl chloride vinyl fluoride and vindylidene chloride. Vinyl aromatic hydrocarbons include styrene, methyl styrenes, and similar lower alkyl styrenes, chlorostyrene, vinyl toluene, vinyl naphthalene, divinyl benzene, and cyclohexene. Vinyl aliphatic hydrocarbon monomers include alpha olefins Vinyl alkyl ethers include methyl vinyl ether, isopropyl vinyl ether, n-butyl vinyl ether, and isobutyl vinyl ether.

Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates, such as hydroxyethyl and hydroxypropyl acrylates and methacrylates, as well as amino acrylates and methacrylates. Hydroxyl functional graft copolymers are produced by specifically copolymerizing hydroxylated ethylenic monomers including hydroxy alkyl acrylates such as 2-hydroxyl ethyl acrylate and methacrylate, 2-hydroxypropyl acrylate and methacrylate, and similar hydroxyl alkyl acrylates. Carboxyl functional ethylenic monomers comprise acrylic acids which include acrylic and methacrylic acid, ethacrylic acid, alpha-chloroacrylic acid, alpha-cycanoacrylic acid, crotonic acid, beta-acryloxy propionic acid, and beta-styryl acrylic acid.

On a weight basis, the ethylenic monomers copolymerized with the unsaturated polyester intermediate include between about 2% and 35% functional hydroxyl or carboxyl ethylenic monomers based on total ethylenic monomer copolymerized. Preferred ethylenic monomer compositions include at least 25% acrylic monomer and preferably between 50% and 100% acrylic monomer, based on total weight monomers copolymerized. The resulting copolymer comprises a polyester-graft-acrylic copolymer containing on a weight basis at least 5% and between 5% and 45% polyester prepolymer, and preferably between 25% and 40%, polyester prepolymer and the balance between 0.1% and 2.5% esterified oxirane ethylenic monomer, and the balance being copolymerized ethylenic monomers including acrylic, hydroxyl and/or carboxyl monomers where such ethylenic monomers preferably comprise between 60% and 90% of the total monomers copolymerized. The number average molecular weight of the polyester-graft-acrylic copolymer should be less than 7,500 and preferably between 3,000 and 5,000 with a tack temperature (Tt) between 160° F. and 190° F.

Referring next to the low melting point crystalline polyester component of the matrix polymeric binder mixture, the crystalline polyester comprises the reaction product of symmetrical reactants of glycol and dicarboxylic acid to produce an ordered linear structure, crystalline polyester polymer. Symmetrical glycols are linear diols having an even number of carbon atoms and terminal hydroxyl groups attached to each terminal carbon atom. Preferred symmetrical glycols are the linear aliphatic chain glycols with terminal hydroxyl groups. Useful glycols include for instance ethylene glycol, 1,4-butylene glycol, 1,6-hexane diol, and neopentyl glycol, 1,4-cycohexanedimethanol. The preferred symmetrical glycol is ethylene glycol. Symmetrical dicarboxylic acids similarly comprise symmetrical aromatic or aliphatic structures having terminal carboxylic acid groups. Useful aliphatic dicarboxylic acids consist of linear aliphatic structures having from 6 to 12 even number of carbon atoms. Useful symmetrical aliphatic dicarboxylic acids include dodecanedioic, adipic, suberic, sebacic and other higher chain length dicarboxylic acids having an even number of carbon atoms. For hydroxyl crystalline polyesters, excess equivalents of symmetrical glycol are preferably esterified with dicarboxylic acids to produce a low melt point, linear, structured crystalline polyester having a number average molecular weight between 1000 and 5000 and preferably between 1500 and 2500. For acid functional crystalline polyesters, the dicarboxylic acid equivalents exceed the equivalents of symmetrical glycol in the esterification reaction. The preferred crystalline polyester has a melt point between about 75° C. and 120° C., and an Acid No. between about 0 and 10 for hydroxyl functional polyesters and between about 50 and 125 for carboxyl functional polyesters. The coating composition comprises on a weight basis between about 5% and 45% crystalline polyester and between about 55% and 95% of the polyester-graft-acrylic copolymer.

Referring next to the crosslinker useful for crosslinking the functionally reactive polyester-graft-acrylic copolymer, useful crosslinking mechanisms include self-crosslinking of the polyester-graft-acrylic copolymer as well as external crosslinkers such as blocked isocyanates, glycolurils, beta-hydroxy alkyl amide crosslinker, and oxirane crosslinkers. For those coating compositions containing an external (separate) crosslinker, preferably the coating contains between about 9% and 40% by weight external (separate) crosslinker.

Self-crosslinking polyester-graft-acrylic copolymers can be produced where the copolymerized ethylenic monomers include beta-hydroxy ester ethylenic monomer to provide beta-hydroxy groups in the acrylic polymer chains. The beta-hydroxy ester groups are self-crosslinking by the terminal hydroxy group on one acrylic chain transesterifying with the ester group of a beta-hydroxy ester group in another acrylic chain. Beta-hydroxy ester ethylenic monomers include hydroxyl alkyl acrylates such as 2-hydroxy ethyl acrylate and methacrylate, 2-hydroxypropyl acrylate and methacrylate, and similar hydroxyl alkyl acrylates. Ordinarily for purposes of producing self-curing acrylic chains, the ethylenic monomers copolymerized should comprise between about 10% and 30% beta-hydroxyl monomers based on the weight of monomers copolymerized. Self-crosslinking polyester-graft-acrylic polymers are produced in a similar manner where the polyester prepolymer containing primarily beta-hydroxyl ester functionality is grafted onto the acrylic polymer. Self-crosslinking crystalline polyesters can be blended with non-self-crosslinking polyesters to provide a crosslinking mechanism upon blending with the polyester graft acrylic copolymer. The resulting polyester-graft-acrylic copolymer blend becomes self-crosslinking by a transesterification cure through crosslinking beta-hydroxy ester groups on the polyester graft, acrylic backbone with beta hydroxy ester groups on the crystalline polyester polymer chain. With the inclusion of suitable catalysts, crosslinking by transesterification will occur. A particularly suitable transesterification catalyst system comprises an onium salt or Lewis base in combination with an epoxy co-catalyst such as described in U.S. Pat. No. 4,749,728, or a weak organic or inorganic acid having a pKa between 2.5 and 14 in conjunction with an epoxy cocatalyst; or an inorganic salt of a halide, azide, cyanide or hydroxide in combination with an epoxy cocatalyst as disclosed in commonly assigned U.S. Pat. No. 4,906,693; where about 0.1 to 10 weight parts catalyst combination is added to 100 weight parts of core-active polyester-graft-acrylic polymer.

Functionally reactive carboxyl functional polyester-graft-acrylic polymers can be crosslinked by an external crosslinker. Carboxyl functional polyester-graft-acrylic copolymers can be produced by including carboxyl ethylenic monomers such as acrylic acid or methacrylic acid in the monomer mix. On a weight basis, preferably about 2% to 7% by weight of the copolymerized ethylenic monomers are carboxyl functional monomers.

A preferred crosslinking component for a functionally reactive carboxyl functional polyester-graft-acrylic copolymer comprises an oxirane functional compound such as a diepoxide. Oxirane crosslinking compounds comprise low molecular weight glycidyl functional acrylates or epoxy functional epoxy resins such as low molecular weight diepoxides. Diglycidyl crosslinkers comprise glycidyl monomers such as acrylic, methacrylic or vinyl derivatives of glycidol copolymerized in solvent with other ethylenic monomers. Preferred oxirane monomers contain pendant oxirane and include glycidyl acrylate, glycidyl methacrylate, and allyl glycidyl ether. The oxirane monomers can be copolymerized with other ethylenically unsaturated monomers which include for example, vinyl aromatic and aliphatic hydrocarbons such as styrene, alpha-methyl styrene and similar substituted styrenes, vinyl naphthalene, vinyl toluene, as well as ethylenically unsaturated esters of acrylic and methacrylic acids. Particularly preferred monomers include, for example, styrene, alpha-methyl/styrene, tertiary butyl styrene, alkyl acrylates such as ethyl acrylate, butyl acrylate, methyl-methacrylate, acrylonitrile, vinyl acrylate, and vinyl methacrylate as well as similar ethylenically unsaturated monomers. The monomer mixture on a weight basis can contain between 15% and 55% oxirane monomers and between 45% and 85% other ethylenically unsaturated monomers. Useful epoxy resin crosslinkers are lower molecular weight epoxy resins containing oxirane groups and can be represented by aromatic resins such as bisphenols reacted with epichlorohydrin, cycloaliphatic resins such as hydrogenated bisphenol based epoxy resins. The epoxy can be a linear epoxy polymer chain although side chain adducts can be produced by coreacting eipchlorohydrin with other dihydric phenols or polyhydric phenols, polyalcohols, and polyfunctional halohydrins. Epichlorohydrin and dichlorohydrin are preferred reactants with phenols to provide pendant epoxy groups. The epoxy resin should have an epoxide equivalent weight between 500 and 2500, and a molecular weight between about 1000 and 5000. On a weight basis, between about 10 and 1000 parts of oxirane crosslinking agent can be added to 100 parts of coreactive polyester-graft-copolymer.

Hydroxyl functional polyester-graft-acrylic copolymers can be crosslinked with glycoluril or isocyanate crosslinking compounds. One suitable crosslinker is glycoluril. Glycoluril derivatives are disclosed in U.S. Pat. No. 4,064,191 and are also known as acetyleneureas. Glycolurils are derived by reacting two moles of urea with one mole of glyoxal to provide a complex ring structure as shown in U.S. Pat. No. 4,540,735; where substitute constituents can be a hydrogen, or a lower alkyl radical, or can be methylolated partially or fully by reacting with 1 to 4 moles of formaldehyde to provide an ethylol glycoluril. The preparation of various glycolurils are illustrated in U.S. Pat. No. 4,064,191 such as tetramethylol glycoluril, tetrabutyoxymethyl glycoluril, partially methyolated glycoluril, tetramethoxymethyl glycoluril, and dimethoxydiethoxy glycoluril. Useful glycoluril derivatives include for example, mono- and dimethylether or dimethylol glycoluril, the trimethylether of tetramethylol glycoluril, the tetramethylether or tetramethylol glycoluril, tetrakisthoxymethyl glycoluril, tetrakisopropoxymethyl glycoluril, tetrakisbutoxymethyl glycoluril, tetrakixamyloxymethyl glycoluril, tetrakishexolymethyl glycoluril and the like. Glycoluril derivatives can further include dimethylol dihydroxyl ethylene urea. About 6 to 15 weight parts glycoluril can be added to 100 weight parts coreactive polyester-graft-acrylic copolymer.

Preferred isocyanate crosslinkers are blocked diisocyanates which become unblocked and activated under heat and at temperatures approximately 100° F. above the melt temperature of the powder paint. Latent blocked isocyanate crosslinking agents useful in the preparation according to this invention are derived from a wide variety of isocyanates and/or mixtures thereof. These include, for example, isophorone diisocyanate, 2,4-tolylene diisocyanate, 2,6-tolylene diisocyanate; alkylene diisocyanates such as 1,4-tetramethylene-diisocyanate; 1,6-hexanemethylene diisocyanate; 1,12-dodecane diisocyanate; cyclobutane and cyclohexane (1,3 and 1,4-) diisocyanates; phenylene diisocyanates (1,3 and 1,4-) and naphthalene-1,5-diisocyanate. Suitable blocking agents are those known in the art and include alcohols, phenol, ketoximes and the like. Especially preferred are 2-ethyl-hexyl alcohol and caprolactam. Preferred isocyanates include isophorone diisocyanate adduct with polyol such as trimethylolpropane and blocked with caprolactam. Blocked isocyanate crosslinkers are adapted to crosslink with hydroxyl functional polyester-graft-acrylic copolymers. On a weight basis, between about 10 and 40 weight parts isocyanate crosslinker can be combined with 100 weight parts of coreactive polyester-graft-acrylic copolymer.

In accordance with the process of this invention, the linear polyester prepolymer comprising the esterification reaction product of ethylene glycol and dodecanedioic acid is first produced by esterifying the reactants in bulk or optionally with minor amounts (1%–3%) of organic solvent at temperatures from about 160° C. up to about 250° C. to produce a carboxyl functional prepolymer. Where hydroxyl functionality is desired, excess equivalents of ethylene glycol are utilized but esterification is concluded prior to consumption of all of the carboxyl groups to provide a hydroxyl functional polyester prepolymer having an Acid No. between about 5 and 25. Since the polyester prepolymer is a low viscosity, fluid polymer at processing temperatures organic solvent need not be added but can be added if desired for processing purposes. In the next step, the polyester prepolymer is reacted with minor amounts of glycidyl functional ethylenic monomer by esterifying carboxyl groups with oxirane to produce pendant double bond unsaturation in the resulting unsaturated polyester intermediate. Carboxyl oxirane esterification occurs at temperatures typically from about 125° C. to 150° C. In the third step, ethylenic monomers are copolymerized with the unsaturated polyester intermediate where the ethylenic monomers copolymerize by addition polymerization with pendant double bonds in the polyester intermediate. Azo or peroxide initiators from about 0.5% to 4% based on the weight of the monomers activate copolymerization of the monomers at temperatures between about 125° C. to 165° C. Organic solvent can be utilized as a processing expedient if desired, for all steps in this process. Useful organic solvents include for instance xylene, toluene, and methyl propyl ketone. Vacuum can be advantageously utilized in the final stage to remove unreacted monomer as well as solvent. The resulting polymer is the polyester-graft-acrylic copolymer which comprises portions of ungrafted polyester, ungrafted acrylic as well as the polyester-graft-acrylic copolymer.

The low melt crystalline polyester can be blended with the polyester-graft-acrylic copolymer, or alternatively, the low melt crystalline polyester can be blended, if desired, with the unsaturated polyester intermediate polymer prior to in-situ copolymerization of the ethylenic monomers. If added prior to the copolymerization of monomers, the low melt crystalline polyester does not affect the level of grafting since grafting is controlled by the level of oxirane functional monomer but can simplify and improve the blending of the two polymers. The Acid No. of the crystalline polyester is maintained relatively low and less than about 7 for hydroxyl functional polyesters but can be between about 50 to 125 for carboxyl functional polyesters. The polymeric mixture can be either self-curing or coreactive with an external crosslinker as described hereinabove. The foregoing polymeric mixtures containing either a self-crosslinking catalyst or crosslinker provides a suitable polymeric binder useful in powder paint.

Paint coatings containing the foregoing polymers as polymeric binders are used as surface protective coating and applied to substrates as a continuous film for the purpose of decorative appearance as well as protection of the substrate Powder paint is applied to the substrate as dry powder and heated to melt the powder particles into a continuous paint film, which can be fused and thermoset under heat. A powder paint coating ordinarily comprises an organic binder, pigments, and various additives. Clear powder coatings are those powder paint coating which do not contain pigment. The polymeric binder, which is thermosetting, acts as a dispersant for the pigments and functions as a binder for the pigments in the cured or hardened paint film. The binder imparts rheological properties to the paint coating and provides adhesion of the paint film to the substrate. The pigments may be organic or inorganic and functionally contribute to opacity and color in addition to durability and hardness, although some powder paint coatings contain little or no opacifying pigments and are described as clear coatings. Pigments ordinarily can include opacifying pigments such as titanium dioxide, zinc oxide, leaded zinc oxide, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower and the like can be added. Up to about 2 weight parts and typically between about 0.6 and 1.3 weight parts of pigment can be combined with one weight part of polymeric binder depending on the adsorbtion properties of the pigment particles. Pigmented powder coatings typically comprise a pigment to binder ratio of about 0.6 to 1.3.

To produce powder coatings, the raw batch ingredients can be thoroughly mixed in a high intensity mixer such as a frustoconical agitator whereby the materials are discharged in a uniform mixture. The high intensity mixer discharges the batch components to a heated extruder. The exit extruder temperature is regulated according to the type of powder paint being produced but generally is between about 80° and 120° C. at the heated exit die of the screw fed extruder. The extrudate emerges from the extruder as a ribbon of less than about 1/16 inch thickness which passes onto a water cooled stainless steel conveyor belt whereby the plastic ribbon extrudate fully hardens. The cooled extrudate then passes through a mechanical commuter disposed at the end of the cooled stainless steel belt to efficiently break the fragile brittle ribbon into very small flakes. The small flakes are then discharged onto a cooled mill, such as a hammer mill, to grind the small particles into powder paint of less than 200 mesh and preferably passing a 140 mesh U.S. Standard sieve screen whereupon the powder can be further classified into particle size if desired.

The advantages of this invention include improved physical properties of an acrylic powder paint; excellent melt-flow rheology, is combined with high flexibility and impact resistance; and overall acrylic coating performance including exterior weatherability is obtained. By grafting the ethylene glycol-dodecanedioic polyester polymer onto an acrylic polymer, compatibility with non-grafted low melt crystalline polyester is substantially improved, which gives considerable latitude with respect to the amount of polyester incorporated in the final product. Polymer blends with tack temperatures in the range of 160° F.–175° F. have acceptable storage stability. The crystalline nature of the crystalline polyester component enables this unusual stability.

The merits of this invention are further illustrated by the following examples wherein parts are by weight and temperatures are in °C. unless otherwise indicated.

EXAMPLES 1, 2 AND 3

Polyester prepolymers were prepared for reaction with glycidyl acrylic and subsequent grafting in accordance with this invention. The polyester prepolymers were prepared by esterifying dodecanedioic acid (DDA) with ethylene glycol to produce polyester prepolymers have an average molecular weight and Acid No. as follows.

a) Low molecular weight of 700 to 1200 grams per mole and Acid No. between 7 and 25.

b) Intermediate molecular weight of 1200 and 2500 grams per mole and Acid No. between 5 and 10.

c) Higher molecular weight of 2500 to 5000 grams per mole and Acid No. below 7.

The modified acrylic polymer is prepared in the presence of a quantity of polyester (a), (b), and (c) above containing acid functionality, and additionally, blended with a sufficient quantity of glycidyl methacrylate (GMA) equivalent to or in excess of the acid equivalents present when glycol equivalents are in excess of acid on the polyester. The reaction conditions must favor the reaction of carboxylic acid on the polyester, with the oxirane functionality on the glycidyl methacrylate (GMA) prior to the addition and polymerization of the acrylic monomers. For acid excess polyesters, GMA must be less than acid equivalents to allow sufficient carboxyl functionality to remain on the copolymer. Subsequent to the acrylic polymerization, a quantity of polyester gel may also be blended with the modified acrylic prepared as described above. However, it is preferably blended in prior to the acrylic polymerization process along with polyester types (a) or (b).

The acrylic/polyester graft polymer is preferably polymerized in the presence of additional ethylene glycol-dodecanedioic acid polymer, in order to initiate the process in a suitable quantity of a liquid medium. Since the ethylene glycol-dodecanedioic acid polymer is a low viscosity liquid at the acrylic polymerization temperature, it is a very suitable medium.

For hydroxyl excess polyesters, a quantity of glycidyl methacrylate is added to (a), (b), and (c) above equivalent to the carboxyl equivalents on the polyester. For carboxyl excess polyesters, the equivalent amount of GMA is less, preferably between about 7% and 25% of unreacted carboxyl equivalents.

Specific polyester prepolymers

| Raw Material | Ex. 1 | Ex. 2 | Ex. 3 |
|---|---|---|---|
| Ethylene glycol | 897 gms. | 857 gms. | 851 gms. |
| Dodecanedioic acid | 2303 gms. | 2343 gms. | 2650 gms. |

Procedure. In Examples 1–3, ethylene glycol and a portion of DDA (400 gms.) were charged to a 5 liter reaction flask equipped with an agitator, nitrogen gas blanket, separation column and condenser, and heated to about 115°–120° C. The remaining DDA was then added and heating continued until 360° C. while removing water of reaction and maintaining 96° C.–100° C. column head temperature. After 2 hours of heating, the batch temperature was increased to about 220° C.±5° C. while removing water reaction and holding for a Acid No. of 15 to 21. The batch reactants were then cooled to room temperature. Resin characteristics were as follows.

| | Ex. 1 | Ex. 2 | Ex. 3 |
|---|---|---|---|
| Acid No. | 19.8 | 15.4 | 1.4 |
| % NVM (non-vol.) | 95.9 | 97.2 | 97.7 |
| Molecular Wt. | 1093 | 1340 | 2803 |

EXAMPLE 4

The carboxyl functional polyester prepolymer of Example 1–3 were farther reacted with sufficient glycidyl methacrylate (GMA) equivalent to or in excess of the acid equivalents in the polyester prepolymer under condition which promote coreaction of the carboxyl groups and the oxirane groups.

| Reactant: | Weight (grams) |
|---|---|
| Polyester prepolymer (Ex. 1) | 271 (0.0956 Eqv.) |
| Polyester prepolymer (Ex. 3) | 352 (0.0088 Eqv.) |
| Xylene | 88 |
| Glycidyl methacrylate | 24 (0.1689 moles) |
| Hydroxyethyl methacrylate (HEMA) | 700 |
| Methyl methacrylate (MMA) | 1087 |
| Styrene | 604 |
| n-Dodecyl mercaptan | 30.2 |

The crystalline polyesters Ex. 1 and Ex. 3 were charged with xylene to a 5 liter reactor flask equipped with nitrogen gas, blanket, agitator, addition funnel and condenser and heated to 30° C. Then, GMA and 6.2 grams of xylene were added. Batch temperature increased to 148° C. and held for about 25 minutes. The ethylenic monomer mixture of HEMA, MMA, and styrene containing the n-dodecyl mercaptan and 54.3 grams azobis initiator 2,2-azobis (2-methylpropanenitrile) (VAZO 67) were added as mixture to the reactor over about 190 minutes while holding the batch temperature between about 140° C. and 149° C. After the monomer addition was complexed the batch was held for about 15 minutes at 144° C. Then, 2.42 grams of x-butyl perbenzoate and 4.80 grams of xylene were added and the batch was held at about 144° C. to 151° C. for about 56 minutes while heating was applied to the reactor for about 100 minutes while heating to 174° C. Then, an addition 325.4 grams of crystalline polyester (b) was added to the reactor and held for 20 minutes while continuing to apply vacuum to the reactor. Resulting resin physical characteristics were as follows.

| | |
|---|---|
| Viscosity | 81–82 poise @ 150° C. (ICI cone & plate) |
| NVM | 98% |
| Tack Temperature | 160–161° F. (Powder sample, for one minute on an aluminum temperature gradient bar). |
| Acid Value | 1.4 mp. KOH per gram |

If weathering properties are not required as in a paint coating not exposed to weather and sunlight, considerably increased amounts of styrene can be substituted for MMA in the acrylic monomer copolymerization step of the polymer synthesis.

EXAMPLE 5

In a procedure similar to Examples 1–4, a polyester-graft-acrylic copolymer was prepared as follows.

Polyester-graft-acrylic copolymer

| Reactant | Weight (grams) |
|---|---|
| Polyester (Ex. 2) | 436 (0.106 eqv. —COOH) |
| Polyester (Ex. 3) | 187 (0.005 eqv. —COOH) |
| Xylene | 88 |
| Methyl propyl ketone | 22 |
| Glycidyl methacrylate | 24 (0.1689 moles) |
| Xylene rinse | 6.2 |
| HEMA | 700 |
| MMA | 1087 |
| Styrene | 604 |

-continued

Polyester-graft-acrylic copolymer

| Reactant | Weight (grams) |
|---|---|
| n-dodecyl mercaptan | 30.2 |
| azobis initiator (VAZO 67) | 54.3 |
| xylene | 15 |
| t-butyl perbenzoate | 2.4 |
| polyester (Ex. 3) | 325.4 |

The resulting resin properties were as follows:

Viscosity: 142–144 poise@150° C. (ICI cone & plate)

Non-volatile (NVM): 97.3%

Tack temperature (Tt): 165°–168° F.

Acid No.: 1.5 mg. KOH/gm.

EXAMPLE 6

An acid functional graft polymer was produced in a manner similar to Examples 1–5 from the following components:

a) Carboxyl functional polyester prepolymer

| | |
|---|---|
| Ethylene glycol | 555 gms. |
| Dodecanedioic acid | 2460 gms. |

Ethylene glycol and dodecanedioic acid were esterified at a temperature of about 220° C. for time sufficient to yield an Acid No. of 70.2 and a calculated molecular weight of about 3069.

b) Polyester-Graft-Acrylic

The polyester prepolymer of (a) above was coreacted with other materials as follows:

| | Grams |
|---|---|
| Polyester prepolymer (a) above | 1233 |
| Xylene | 80 |
| Methyl propyl ketone | 20 |
| Glycidyl methacrylate | 9.6 |
| Methacrylic acid | 84 |
| Methyl methacrylate | 1185 |
| Styrene | 548 |
| N-dodecyl mercaptan | 12.2 |
| Azobis initiator Vazo 67 | 36.5 |

The physical characteristics of the resulting acid functional graft acrylic polymer were as follows:

| | |
|---|---|
| Viscosity | 52 Poise @ 150° C. |
| Non-volatile | 98.4% |
| Tack Temp. | 179° F. |
| Acid Value | 43.0 mg KOH per gram |

To provide a transesterification cure, a catalytic amount of a GMA-acrylic copolymer or a bisphenol epoxy can be combined with a nucleophilic cocatalyst to provide a catalyst system for transesterification cures. GMA acrylic is desired for weather resistant coatings while bisphenol epoxy is useful in other coatings. A suitable catalyst combination comprises between 1 and 20 weight parts catalytic oxirane compound and between 0.1 and 10 weight parts nucleophilic compound per 100 weight parts of polymer binder, where the nucleophilic compound can be selected from (a) an onium salt, (b) a Lewis base, (c) a conjugate base of a weak acid having a pka between 2.5 and 14, or (d) an inorganic salt of a halide, an azide, a cyanide or a hydroxide. Pigmented coatings typically contain titanium dioxide. To provide a powder paint, the ingredients can be premixed using a high-intensity mixer, then melt mixed and extruded at a jacket temperature of 65°–90° C. The extrudate can be ground using a hammer-mill to produce a powder particle size of 25–40 microns and classified using a 140 mesh screen. The resulting powder paint can be applied electrostatically to metal substrates using a corona discharge gun to film builds of about 1.5 to 2 mils thickness. The applied films should be heat cured for about 20 minutes at 375° F.

EXAMPLES 7 AND 8

Powder paints were produced based on a polymeric binder comprising a polyester-graft-acrylic resin system containing a minimum of 25% by weight polyester and an acrylic monomer composition low enough in aromatic content to provide weather resistance. The graft-acrylic polymer further contains sufficient hydroxyl groups provided by HEMA to serve as crosslinking sites for transesterification cure with a crosslinker. The crosslinker comprises an ethylene glycol capped crystalline polyester including sufficient beta-hydroxy ester functionality in the system to undergo transesterification upon heating. The transesterification catalyst comprises a catalytic amount of a glycidyl functional resin with a catalytic amount of basic nucleophilic compound such as triphenyl tin hydroxide (TPT-OH) or methyl diethanol amine (MDEA), where the two cocatalyst interact to form a alkoxide ion which, upon heating, activates the transesterification curing reaction.

Specific powder paint coatings were produced based on a polymeric binder comprising polyester grafted acrylic copolymer and a crystalline polyester.

| | Ex. 7 | Ex. 8 |
|---|---|---|
| Polyester-graft-acrylic (Ex. 5) 80.4%, crystalline polyester (Ex. 2) 19.6% | 92 | 92 |
| GMA acrylic (25% GMA) cocatalyst | 8 | 8 |
| Triphenyl tin hydroxide cocatalyst | 0.75 | 0.75 |
| Flow agent (Resiflow PL200) | 1.04 | 1.04 |
| Benzoin degassing agent | 0.55 | 0.55 |
| Titanium dioxide pigment | 0 | 60 |

The above ingredient components were mixed together in a high-intensity Welex mixer and subsequently melt-mix extruded at a jacket temperature of about 80° C.±5° C. The extrudate was ground using a hammer mill to a particle size of 25–40 microns. The powder was classified by passing the powder particles through a 140 mesh screen.

A clear powder paint was similarly produced as in Example 7 except the polyester-graft-acrylic and crystalline polyester were replaced with a polymeric binder system comprising a GMA acrylic copolymer mixed with dodecanedioic acid (DDA) on a comparable weight basis. The resulting powder paint indicated in Example A below was brittle, had poor impact resistance, and an inferior texture rating. Similarly, attempts to mix an ethylene glycol polyester with a non-grafted acrylic copolymer were unsuccessful due to incompatibility.

The powder paint characteristics of the above compositions were as follows:

| | Ex. A Clear | Ex. 7 Clear | Ex. 8 White |
|---|---|---|---|
| % polyester | 0 | 30% | 30% |
| 375° F. Gel Time | 45" | 180" | 181" |
| Inclined plate flow | 158 mm | >244 mm | 185 mm |
| GPF (30° @ 300° F.) | | | |
| Tack temp. (°F.) | 170 | 157 | 159 |
| Storage Stability where "1" is poor and "10" is superior. (40° C., 1 week) | 8 | 7 | 7 |
| % GT retained | 78 | 75 | 83 |
| % GPF retained | 98 | 100 | 100 |
| Gloss 20°/60° | 87/111 | 88/100 | 83/93 |
| Texture (where "1" is poor and "10" is superior). | 8 | 9 | 7 |
| Ave. Part. Size | 36μ | 46μ | 55μ |
| Impact (D/R) | 25/5 in-lbs | 160/160 | 120/100 |
| $KHN_{25}$ | 12.8 | 10.7 | 13.54 |
| MEK Double Rubs | 142 | 225 | 300 |
| Outgassing | — | None up to 4.0 mils | None up to 4.0 mils |
| Approximate hours to 50% gross loss (60°) | | | |
| WOM | | 2800 hrs. | 3000 hrs. |
| ASTM QUV | | 1400 hrs. | 2600 hrs. |
| GM QUV | | 850 hrs. | 1500 hrs. |

The foregoing description and illustrative examples are not intended to be limiting except by the appended claims.

We claim:

1. A thermosetting powder paint coating composition containing a coreactive crosslinker and a polymeric binder comprising on a weight basis:

between 55% and 95% of a polyester-graft-acrylic copolymer produced by producing a hydroxyl or carboxyl functional low molecular weight polyester prepolymer comprising dodecanedioic acid esterified with glycol, then reacting the polyester prepolymer with an oxirane functional ethylenic monomer to produce a polyester intermediate polymer containing pendant double bonds followed by in-situ copolymerization with ethylenically unsaturated monomers including acrylic monomers to produce said polyester-graft-acrylic copolymer;

between 5% and 45% of a low molecular weight crystalline polyester produced by esterifying a symmetrical glycol with a symmetrical aromatic dicarboxylic acid *or a symmetrical aliphatic dicarboxylic acid* having from 6 to 12 even numbered carbon atoms.

2. The powder coating of claim 1 where the polyester-graft-acrylic copolymer is carboxyl functional and where the carboxyl functional monomers comprise between 2% and 7% of ethylenically unsaturated monomers.

3. The powder coating of claim 1 where the polyester-graft-acrylic copolymer is hydroxyl functional.

4. The powder coating of claim 2 where the coreactive crosslinker is selected from an epoxy crosslinker or a beta hydroxy alkyl amide polymer.

5. The powder coating in claim 3 where the coreactive crosslinker is selected from a glycoluril or a blocked diisocyanate.

6. The powder coating of claim 2 wherein the coreactive crosslinker is adapted to crosslink with the carboxyl functionality.

7. The powder coating of claim 3 wherein the coreactive crosslinker is adapted to crosslink with the hydroxyl functionality.

* * * * *